Nov. 17, 1953  W. H. WOOD  2,659,314
GEAR PUMP

Filed Sept. 22, 1949  2 Sheets-Sheet 1

Inventor
WALLACE H. WOOD
By Harold W. Eaton
Attorney

Nov. 17, 1953  W. H. WOOD  2,659,314
GEAR PUMP
Filed Sept. 22, 1949
2 Sheets-Sheet 2

Inventor
WALLACE H. WOOD
By Harold W. Eaton
Attorney

Patented Nov. 17, 1953

2,659,314

UNITED STATES PATENT OFFICE 2,659,314

GEAR PUMP

Wallace H. Wood, Worcester, Mass., assignor to Norton Company, Worcester, Mass., a corporation of Massachusetts Application September 22, 1949, Serial No. 117,105

2 Claims. (Cl. 103—126)

The invention relates to fluid pumps and more particularly to a gear-type pump for conveying fluid or lubricant under pressure.

One object of the invention is to provide a simple and thoroughly practical reversible gear pump for conveying fluid or lubricant under pressure in the same direction regardless of direction of rotation of the drive shaft. Another object of the invention is to provide a fluid pump which may be used for conveying lubricant under pressure to table ways in which the pump is driven by means of driving connections with a moving part of the machine. Another object of the invention is to provide a lubricant pump which is geared to the rack bar on a reciprocable table so that the reciprocatory movement of the table drives the pump. Another object of the invention is to provide a gear pump in which the driven gear is arranged to shift laterally within the pump casing so as to reverse the intake flow of fluid or lubricant to provide an output flow of fluid or lubricant in the same direction regardless of the direction of rotation of the pump drive shaft. A further object of the invention is to provide a gear pump in which the driven gear in the pump is arranged to shift in a direction normal to the axis of rotation so as to serve as a valve to cause the fluid input flow to pass to one or two pump chambers depending upon the direction of rotation of the drive shaft so that an output flow is obtained in the same direction regardless of the direction of rotation of the drive shaft. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of this invention:

Figure 1:
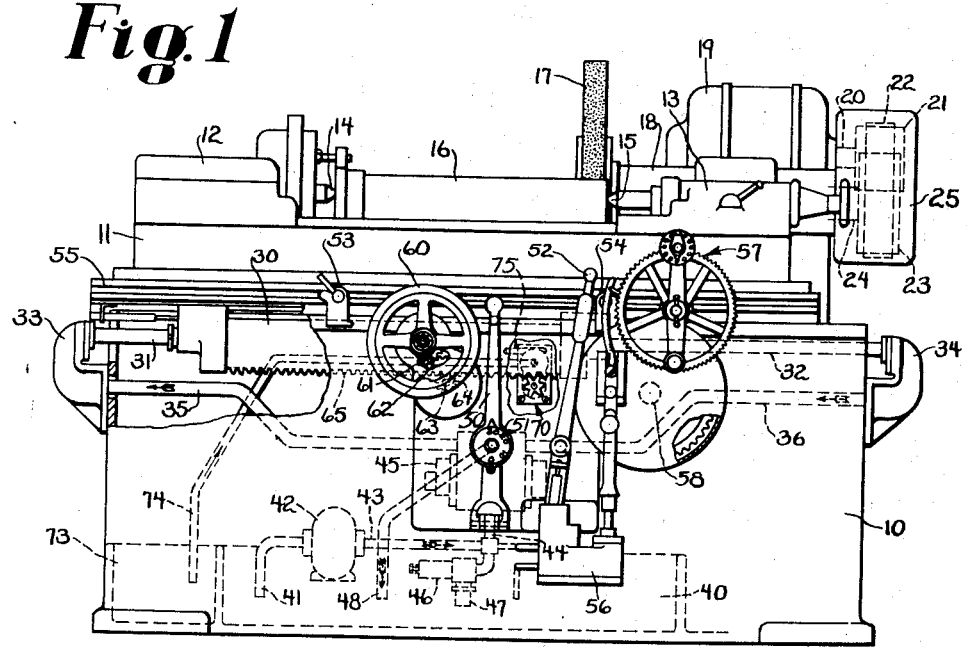
Fig. 1 is a front elevation of a grinding machine embodying this invention.

The fluid pump has been illustrated as a lubricant pump for use in connection with machine tools, such as cylindrical grinding machines and the like. As illustrated in the drawings a grinding machine is provided having a base 10 which supports a longitudinally reciprocable table 11. The table 11 serves as a support for a headstock 12 and a footstock 13 which are provided with a headstock center 14 and a footstock center 15 respectively. The centers 14 and 15 serve as a support for a rotatable work piece 16.

A rotatable grinding wheel 17 is rotatably supported on a transversely movable wheel slide 18. A driving motor 19 is mounted on the upper portion of the wheel slide 18. The motor 19 is provided with an armature shaft 20 having a pulley 21 which is connected by a driving belt 22 with a pulley 23 which is mounted on the right hand end of a wheel spindle 24, the other end of which supports the grinding wheel 17. A belt guard 25 surrounds the driving mechanism above described.

The table 11 may be reciprocated either manually or by power preferably by means of a fluid pressure cylinder 50 which contains a pair of spaced slidably mounted pistons (not shown). The pistons are connected by means of hollow piston rods 30 and 31 respectively with hollow brackets 33 and 34 respectively which are fixedly mounted on opposite ends of the base 10. Fluid under pressure may be passed through either a pipe 35 or a pipe 36 to opposite ends of the cylinder 30. This table driving mechanism is identical with that shown in my prior U. S. Patent No. 2,071,677, dated February 23, 1937, to which reference may be had for details of disclosure not contained herein.

The base 10 is formed as a hollow, box-like construction in which the lower portion serves as a reservoir 40 for the fluid pressure system. Fluid is drawn from the reservoir 40 through a pipe 41 by means of a motor driven fluid pump 42 and is forced through a pipe 43 and a pipe 44 to a table controlling and reversing valve 45. A fluid pressure relief valve 46 is provided in the pipe 44 to allow excess fluid under pressure to bypass through a pipe 47 directly into the reservoir 40 thereby maintaining a substantially uniform pressure of the fluid within the system.

A start-stop lever 50 is provided for controlling the starting and stopping of the fluid flow. A speed control knob 51 is provided for regulating the exhaust of fluid from the table cylinder to control the speed of movement of the table 11. A pivotally mounted table actuated reversing lever 52 is provided for shifting the reversing valve 45 to change the direction of movement of the table. A pair of adjustable table dogs 53 and 54 are mounted in a T-slot 55 formed in the front edge of the table 11 for actuating the reversing lever 52. A hydraulic wheel feed actuator 56 is provided for transmitting a rotary motion to a feed wheel 57 which is geared to rotate a feed screw shaft 58. The feed wheel 57 may be either actuated automatically or manually as desired. This control mechanism above described is identical with that shown in my prior Patent No. 2,071,677 consequently it has not been shown and described in detail in the present case since it is not considered a part of the present invention. For details of disclosure not contained herein reference may be had to my prior above mentioned patent.

A manually operable table traverse mechanism is provided for traversing the table 11 longitudinally. This mechanism may comprise a manually operable traverse wheel 60 which rotates a gear 61 meshing with a gear 62 which is fixedly mounted on a rotatable shaft 63. The shaft 63 also carries a gear 64 which meshes with a rack bar 65 formed on the underside of the table 11.

Figure 2:
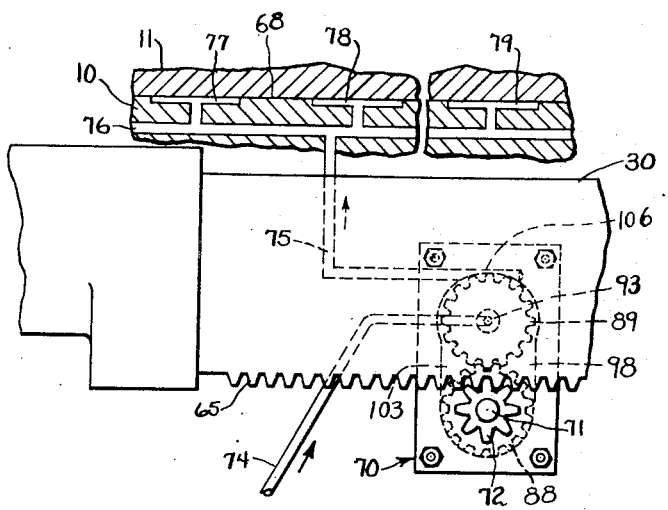
Fig. 2 is a fragmentary elevation, partly in section, on an enlarged scale, of the lubricant pump and system.

In order to attain one of the main objects of this invention, a fluid pump 70 is provided for conveying fluid such as lubricant under pressure to a plurality of ways 68 formed between the table 11 and the base 10. The lubricant pump 70 is a gear-type pump having a casing comprising three flat plates 80, 81 and 82. A rotatable drive shaft 71 is rotatably supported by the casing. A driving gear 72 is fixedly mounted on the shaft 71 and is arranged to mesh with the rack bar 65 carried by the table 11. A lubricant reservoir 73 is provided in the base 10 from which fluid is drawn through a pipe 74 by means of the pump 70 and is forced under pressure through a pipe 75 which connects with a longitudinally extending passage 76. The passage 76 is connected with a plurality of oil grooves 77, 78 and 79 (Fig. 2).

The plates 80, 81 and 82 forming the pump casing are held together by a plurality of bolts 83, 84, 85 and 86. A pump aperture 87 is formed within the plate 82. The drive shaft 71 is provided with a driving gear 88 which is arranged to rotate within a semi-cylindrical portion 90 of the pump aperture 87. An impeller pump gear 89 meshes with the driving gear 88 and is arranged to be peripherally supported within an elongated portion of the pump aperture 87 having semi-cylindrical ends 91 and 91a to facilitate a lateral shifting movement of the impeller gear 89.

The driving gear 88 and the impeller gear 89 are preferably substantially the same width as the thickness of the plate 82 so that they may readily turn within the pump aperture 87. When the drive shaft 71 is rotated in a clockwise direction such as when the table 11 moves toward the right, the rotary thrust of the driving gear 88 causes the impeller gear 89 to move laterally toward the right into the position illustrated in Fig. 5 so that the peripheries of the teeth of the gear 89 engage the semi-cylindrical surface 91. Similarly when the shaft 71 is rotated in a counterclockwise direction, such as when the table 11 moves toward the left, the rotary thrust of the driving gear 88 causes the impeller gear 89 to move laterally toward the left into the position illustrated in Fig. 4.

Figure 5:
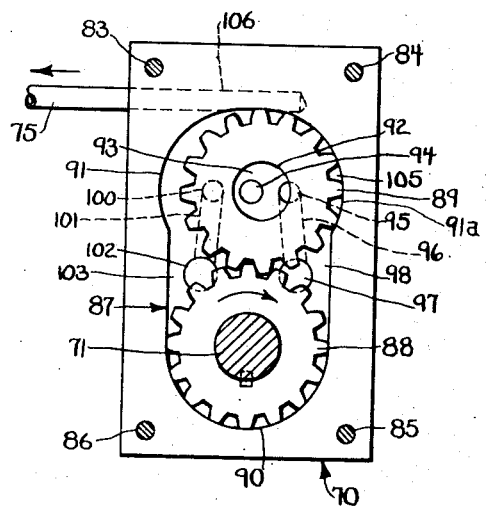
Fig. 5 is a similar vertical sectional view, through the pump, showing the position of the pump gears when the drive shaft is rotated in a clockwise direction.
Figure 3:
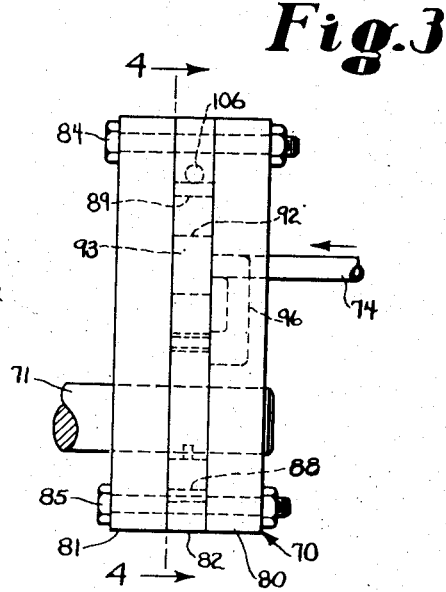
Fig. 3 is a side elevation, on an enlarged scale, of the lubricant pump.

The impeller gear 89 is provided with a central aperture 92 which serves as an intake chamber 93. The intake of fluid from the pipe 74 passes through a port 94 into the intake chamber 93. In the position of the parts as illustrated in Fig. 5 fluid within the intake chamber 93 is drawn through a port 95, through a passage 96 and through a port 97 into a pump chamber 98 formed at the right of the meshing gears 88 and 89. During rotary motion of the shaft 71 and driving gear 88 in a clockwise direction, a counterclockwise rotation of the impeller gear 89 is obtained.

Figure 4:
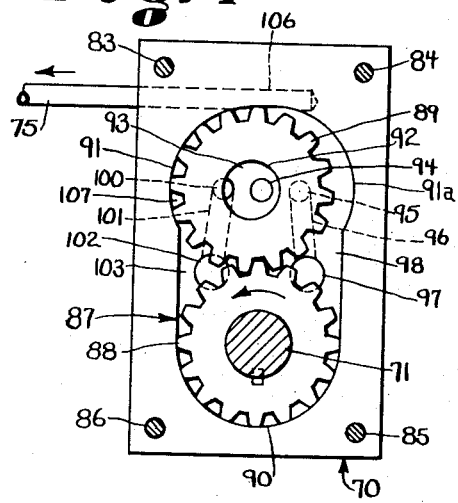
Fig. 4 is a vertical sectional view, taken approximately on the line 4—4 of Fig. 3, through the lubricant pump showing the position of the gears when the drive shaft is rotated in a counterclockwise direction.
Figure 6:
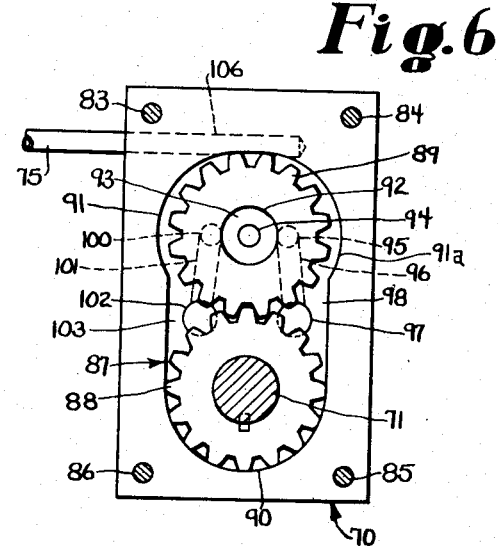
Fig. 6 is a similar vertical sectional view through the pump showing the driven gear of the pump in an intermediate position through which it passes when the direction of rotation of the drive shaft is reversed.

Similarly when the shaft 71 is rotated in a counterclockwise direction as illustrated in Fig. 4, fluid within the intake chamber 93 is drawn through a port 100, through a passage 101, and through a port 102 into a pump chamber 103 formed at the left of the meshing gears 88 and 89.

Referring to Fig. 1, when the shaft 71 and driving gear 88 are rotated in a clockwise direction and the impeller gear 89 is rotated in a counterclockwise direction, fluid within the pump chamber 98 is carried by chambers 105 formed between the teeth of the gear 89 to a discharge passage 106 which connects with the pipe 75 to supply fluid such as a lubricant under pressure for lubricating the table ways.

Similarly when the shaft 71 and driving gear 88 are rotated in a counterclockwise direction and the impeller gear 89 is rotated in a clockwise direction, fluid within the pump chamber 103 (Fig. 4) is carried by chambers 107 formed as the spaces between the teeth of the gear 89 to force fluid under pressure into the passage 106 which forces fluid under pressure through the pipe 75 in the same direction regardless of the direction of rotation of the drive shaft 71. It will be readily apparent from the foregoing disclosure that the drive shaft 74 being geared to rotate as the table 11 reciprocates, will rotate the gears 88 and 89 in opposite directions depending upon the direction of movement of the table 11.

The aperture 92 in the impeller gear 89 is preferably of such a size that it serves as a valve to open and close the ports 95 and 100 when the impeller gear 89 is moved laterally between the semi-cylindrical surfaces 91 and 91a of the pump aperture 87. As shown in Fig. 5 when the shaft 71 is rotated in a clockwise direction, the port 95 is opened and when the shaft 71 is rotated in a counterclockwise direction, the impeller gear 89 is shifted laterally toward the left to close the port 95 and open the port 100 so that the intake of fluid passes through the pump chamber 103.

The pump 70 has been described and referred to as a fluid lubricant pump for supplying lubricant under pressure for table ways and the like. This pump is equally applicable to any installation where it is desired to drive the pump from a reciprocatory member or a reversible rotary member of a machine tool. The intake of fluid is always in the same direction and the discharge of fluid is likewise in the same direction due to the fact that the lateral shifting of the driven gear 89 causes the inflow of fluid to pass either to the pump chamber 98 or the pump chamber 103 depending upon the direction of rotation of the drive shaft.

The operation of this improved fluid pump will be readily apparent from the foregoing disclosure.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a gear pump having a casing, a drive shaft rotatably supported therein, a driving gear on said shaft, an aperture within said casing having a partial cylindrical surface surrounding a portion of said driving gear and in sealing contact therewith and being provided with an elongated widened portion having semi-cylindrical surfaces, a laterally movable impeller gear within said widened portion of said aperture which meshes with said driving gear, said impeller gear being arranged to shift laterally in said widened portion of the aperture in a direction normal to its axis of rotation, said direction being dependent upon the direction of rotation of the drive shaft, said semi-cylindrical surfaces serving rotatably to support said impeller gear alternately in sealing engagement therewith in one or the other of its two operating positions, a pair of spaced pump chambers provided in said aperture on opposite sides of the meshing gears, a discharge passage in the casing, connected to one of said pump chambers when the impeller gear is in one operating position and to the other of said pump chambers when the impeller gear is in the other operating position, an intake chamber within said impeller gear, a pair of spaced passages in said casing each having one end connected with one of said pump chambers, and spaced ports at the other end of each of said spaced passages opening into said intake chamber, the spacing of said ports being such that they are alternately opened and closed by the lateral movement of the impeller gear so that the discharge of fluid under pressure is always in the same direction regardless of direction of rotation of drive shaft.

2. In a gear pump having a casing, a drive shaft rotatably supported therein, a driving gear on said shaft, an aperture within said casing having a partial cylindrical surface surrounding a portion of said driving gear and in sealing contact therewith and being provided with an elongated widened portion having semi-cylindrical surfaces, a laterally movable impeller gear within said widened portion of said aperture which meshes with said driving gear, said impeller gear being arranged to shift laterally in said widened portion of the aperture in a direction normal to its axis of rotation, said direction being dependent upon the direction of rotation of the drive shaft, said semi-cylindrical surfaces serving rotatably to support said impeller gear alternately in sealing engagement therewith in one or the other of its two operating positions, a pair of independent pump chambers provided in said aperture on opposite sides of the meshing gears, a discharge passage in the casing connected to one of said pump chambers when the impeller gear is in one operating position and to the other of said pump chambers when the impeller gear is in its other operating position, a central intake chamber within said impeller gear, a pair of spaced independent passages in said casing each having one end connected with one of said pump chambers, a pipe to convey fluid to said intake chamber, means including a pipe to discharge fluid under pressure from said discharge passage, and spaced ports at the other end of each of said pair of spaced passages opening into said intake chamber, the spacing of said ports being such that they are alternately opened and closed by the lateral movement of the impeller gear so that the discharge of fluid under pressure is always in the same direction regardless of direction of rotation of the drive shaft.

WALLACE H. WOOD.

References Cited in the file of this patent

UNITED STATES PATENTS

| Number | Name | Date |
|---|---|---|
| 917,466 | Lees | Apr. 6, 1909 |
| 2,396,147 | Baldenhofer | Mar. 5, 1946 |

FOREIGN PATENTS

| Number | Country | Date |
|---|---|---|
| 359,508 | Great Britain | Oct. 26, 1931 |